United States Patent

[11] 3,584,617

| [72] | Inventors | Stephen Stachenko<br>Preville, Quebec;<br>Alan J. Roberts, St. Lambert, Quebec; John H. Magee, Baie D'urfe, Quebec, all of, Canada |
|---|---|---|
| [21] | Appl. No. | 807,331 |
| [22] | Filed | Mar. 14, 1969 |
| [45] | Patented | June 15, 1971 |
| [73] | Assignee | Canada and Dominion Sugar Company Limited<br>Montreal, Quebec, Canada |
| [32] | Priority | Mar. 15, 1968 |
| [33] | | Great Britain |
| [31] | | 12800/68 |

[54] PRODUCTION OF SOFT SUGAR
13 Claims, 2 Drawing Figs.

[52] U.S. Cl. .................................................. 127/63, 127/30
[51] Int. Cl. .................................................. C13f 3/00

[50] Field of Search .................................... 127/30, 63, 29, 61, 63, 58

[56] References Cited
UNITED STATES PATENTS

| 2,668,128 | 2/1954 | Oxnard ........................ | 127/30 |
| 2,910,388 | 10/1959 | Lachmann .................... | 127/30 |
| 3,074,821 | 1/1963 | Laperouse .................... | 127/30 X |
| 3,098,767 | 7/1963 | Bush ............................. | 127/30 X |
| 3,143,428 | 8/1964 | Reimers ....................... | 127/30 X |

Primary Examiner—Morris O. Wolk
Assistant Examiner—Sidney Marantz
Attorney—Alan Swabey ABSTRACT: Soft sugar or brown sugar is produced by atomizing syrup under pressure onto a falling curtain of white sugar. The white sugar particles should present a sufficiently large surface area. The process is of general applicability and can be reproduced. The product is uniform. The composition of the syrup can be controlled.

INVENTORS
Stephen STACHENKO
Alan John ROBERTS
John Howarth MAGEE

ATTORNEY

3,584,617

PRODUCTION OF SOFT SUGAR

BACKGROUND OF THE INVENTION

This invention relates to the production of soft sugar.

Soft sugar, also termed brown sugar, yellow sugar or golden sugar, is that sugar obtained from the syrup originating from the sugar refining process. It contains compounds which give it a distinctive color and taste, compounds which are not present in pure white sugar.

According to prior art processes, soft sugar is prepared by subjecting syrup containing 80—85 percent sugar to several steps including filtration, decolorization, evaporation, crystallization and centrifugation. This last step separates a composition into approximately 40 percent liquid and 60 percent solid. This solid is the desired soft sugar. The byproduct liquid is finally recovered as molasses.

A disadvantage inherent in the production of soft sugar by prior art practices is the fact that the yield in soft sugar is inherently restricted to about 60 percent, the byproduct being of little comparable value. The product of soft sugar therefore necessitates a very high investment in comparison to the return, assuming that there is no loss of yield. In practice, especially in view of the several steps involved in the process, some loss of yield is always encountered.

A further disadvantage is that it is very difficult to obtain a standard product by prior art methods. In fact, the product obtained varies in quality, color and stability from day to day. Of course, product standardization between different plants or origins is quite impossible.

The prior art suggested the production of soft sugar by mechanical mixing of white sugar with the syrup to overcome the above. However, mechanical mixing does not generally result in intimate contacting of syrup and sugar, and thus gives a product which is not very homogeneous. Further difficulties are encountered with this process when the desired product contains more than approximately 2.5 percent moisture.

OBJECT OF THE INVENTION

It is an object of the invention to provide an efficient process for preparing soft sugar.

It is another object of the invention to provide an improved soft sugar product.

These and other objects will become apparent from the description to follow.

SUMMARY OF THE INVENTION

In accordance with the present invention, there is provided a new process for preparing soft sugar which comprises in its essential aspects atomizing onto white sugar a carrier liquid or sugar syrup of controlled composition.

In order to achieve uniform coating, there is provided in accordance with one embodiment of the invention, a thin curtain of falling sugar which is contacted with a finely divided syrup spray at high velocity, resulting in each particle of white sugar being coated with a uniform coating of syrup.

The atomization of the syrup can be achieved by the use of high pressure pumps and associated spraying apparatus which deliver the syrup at a pressure of about 1000—3000 p.s.i.

In order to obtain a uniform product, it will be understood by persons skilled in the art that the white sugar used should also be uniform in size. In practice, it has been found advantageous to use white sugar of small particle size, e.g., less than 0.01 inch, preferably less than 0.008 inch, in order to provide adequate surface area to the impinging syrup. However, the invention is not to be restricted to this embodiment only.

The syrup employed for spraying contains from 15 percent to 25 percent water, 15 percent to 40 percent invert sugar and may contain 6 percent to 10 percent mineral salts. Specific embodiments of the invention include the use of a syrup containing from 18 percent to 22 percent water while a specially preferred embodiment employs syrup containing about 20 percent water. This syrup will preferably be decolorized by treatment with absorbents and/or reaction by chemical precipitation. The color of the syrup will be a function of the desired color in the finished product, so as to be designated yellow sugar or dark brown sugar as desired, in accordance with well known commercial terms. In a specific embodiment of the invention, the color of the syrup as measured on a spectrophotometer was 11,000 units of milliabsorbency measured at 420 $\mu$ wavelength. Supplementary flavoring compounds or coloring ingredients may be added to the syrup as desired.

The color of yellow sugar, measured in the same manner, usually varies between 1300 and 3300 Color Units while that of dark brown sugar usually varies between 4500 and 9000 Color Units.

The thickness of the coating layer of syrup onto the white sugar particles can be varied considerably by control of the white sugar output or of the syrup spray output or both. In practice, best results are obtained when the coating layer attains a thickness of about 0.1 to 1 micron.

In accordance with the present invention, there is also provided soft sugar comprising coated particles obtained by coating white sugar particles with syrup, each particle being uniformly coated with said syrup, said particles having uniform color and size.

BRIEF DESCRIPTION OF THE DRAWINGS

The invention will now be described in further detail with reference to the accompanying nonlimiting drawings wherein FIGS. 2B and 2C represent microphotographs of staple articles of commerce.

DESCRIPTION OF PREFERRED EMBODIMENTS

Figure 1:
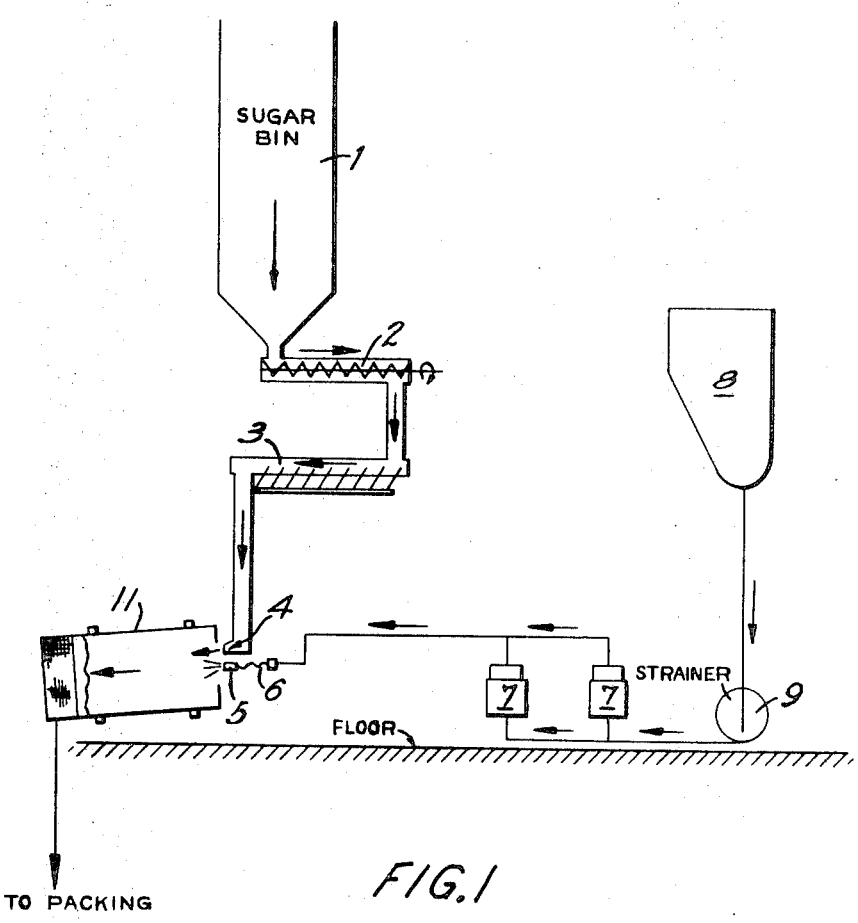
FIG. 1 represents a flow diagram of the process of the invention.

As illustrated in FIG. 1, white sugar is stored in bin 1, from where it is fed to the process by a variable feeder 2, then to an oscillator 3 and a spreader 4.

From spreader 4, the white sugar falls in a curtainlike manner and, while falling, it is contacted with syrup from spray nozzles 5 of sprayer 6, which spray syrup at high pressure (1000—3000 p.s.i.) and/or high velocity onto the particles of white sugar falling in curtainlike like manner.

The sprayer is fed from an adequate number of high pressure pumps 7 which are fed with the syrup at ordinary pressure from storage tank 8. A strainer 9 is usually interplaced between the syrup tanks and the high pressure pumps.

The temperature of the syrup should be maintained high enough to allow proper flowability. Excellent results have been obtained by using syrup at a temperature of 55—75° C. However, an operable temperature range includes temperatures of 45°—85° C.

The contact between white sugar and syrup occurs at the curtain level, and the turbulence produced is contained within a rotary tumbler 11, a rotating drum with internal baffles. As the drum turns, the coating sugar is conveyed towards the opposite end of the tumbler, thence to packing. The prime purpose of the drum is to convey the material, to contain dust and spray mist within an enclosed area.

The present invention will now be described in further detail with reference to the following nonlimiting example.

EXAMPLE

White sugar having an average particle size of 0.008 inch was treated in the apparatus described in the following manner. The white sugar was fed from storage bin 1, through feeder 2 and oscillator 3 to spreader 4. Spreader 4 produced a curtain of white sugar falling into tumbler 11. The white sugar was fed in at a rate of 20,000 lbs/hr. A syrup having the following composition:

Sucrose percent Solids     64.0
Invert percent Solids     20.4

Ash percent Solids 7.9
Organic percent Solids 7.7
pH 5.1
Color 11,000 and having a solids content of 80.8 percent was simultaneously introduced from storage tank 8 through strainer 9, pressurized by feeding through pressure pumps 7 to produce a high pressure of 1450 p.s.i. and sprayed at that pressure by spray nozzles 5 at a rate of 4000 lbs/hr. into tumbler 11.

The color was measured on a spectrophotometer in milliabsorbency units, measured at 420 $\mu$ wavelength.

The syrup was thus sprayed onto the curtain of white sugar in the manner described hereinbefore and deposited a coating of 0.1–1 $\mu$ of syrup onto the white sugar particles. The resulting product was moved through rotating tumbler 11, thence to packing.

The product obtained had the following characteristics:

Sucrose percent 91.0
Invert percent 3.3
Ash percent 1.3
Organic percent 1.3
Moisture percent 3.1
pH 6.0
Color 2,000

The color was measured on a spectrophotometer in milliabsorbency units, measured at 420 $\mu$ wavelength.

The product of the invention shows crystals that are well formed and are relatively uniform in size and color. In accordance with the present invention, it is possible to control both within narrow margins and easily within 10 percent of the desired value.

Table I shows the particle size distribution range of an embodiment of the product of the invention (Product A), compared with the particle size distribution range of Products B and C, commercially available yellow sugar from two different sources, prepared in a conventional manner, the particle size distribution being determined by wet sieving.

TABLE I

| | On 50 mesh screen (percent) | On 60 mesh screen (percent) | On 100 mesh screen (percent) | Through 100 mesh screen (percent) |
|---|---|---|---|---|
| Product A | 2.4 | 9.6 | 46.2 | 41.8 |
| Product B | 63.6 | 12.0 | 8.4 | 16.0 |
| Product C | 20.2 | 6.8 | 21.0 | 52.0 |

Figure 2:
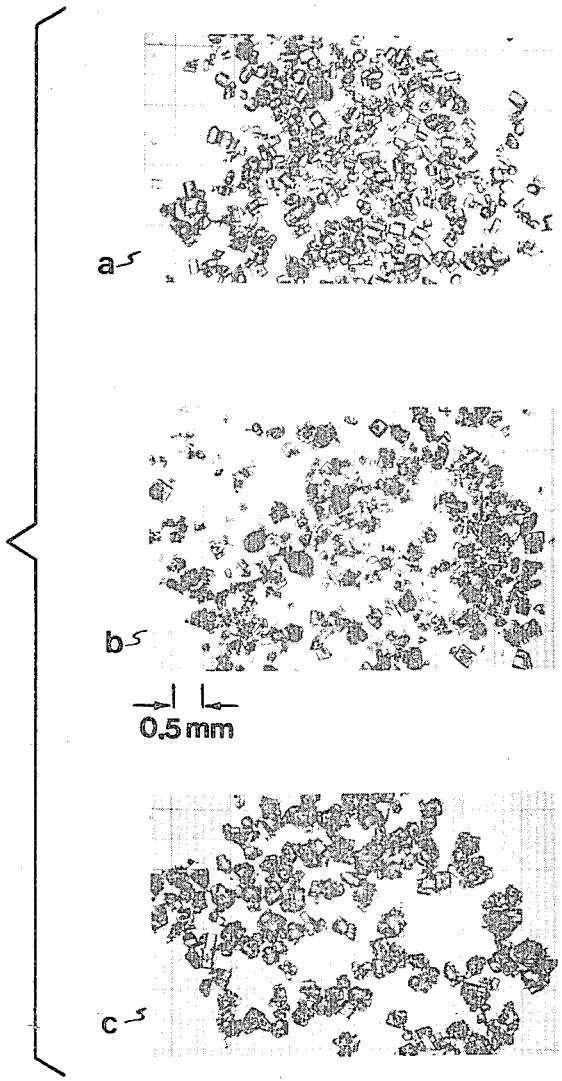
FIG. 2 represents a microphotograph (magnification 10X) of the product of an embodiment of the invention.

FIG. 2A is a microphotograph (magnification 10X) of Product A while FIGS. 2B and 2C are microphotographs (magnification 10X) of Products B and C respectively.

It will be understood that the invention, although described in connection with a preferred embodiment, should not be restricted thereto. Thus, while the invention is primarily concerned with the preparation of soft sugar, it can also be used to advantage in preparing flavored sugar or in coating sugar with special liquid preparations as desired.

It will also be understood that the apparatus described in connection with the process of the invention is not the only apparatus that can be used and that other means can be found of obtaining the results and the advantages of the invention.

We claim:

1. Process for the production of soft sugar which comprises: atomizing onto a falling curtain of white sugar an edible carrier liquid comprising sugar syrup.

2. Process as defined in claim 1 wherein said atomizing is carried out at a pressure of 1000–3000 p.s.i.

3. Process as defined in claim 1 wherein the temperature during said atomizing is maintained at 45°–85° C.

4. Process as defined in claim 1 wherein the white sugar feed rate or the syrup atomization rate or both are controlled to obtain a coating layer having a thickness of 0.1 to 1 micron.

5. Process as defined in claim 1 wherein said syrup contains about 20 percent water, 14 percent to 40 percent invert sugar and 6 percent to 10 percent mineral salts.

6. Process as defined in claim 5 wherein said syrup has previously been decolorized.

7. Process for the production of soft sugar which comprises: allowing white sugar having an average particle size of less than 0.01 inch to drop in a curtainlike manner,
    atomizing by spraying a syrup containing invert sugar onto said falling white sugar at a high pressure, controlling the rate of feed of the white sugar or the rate of spraying of the syrup or both so as to obtain a coating layer of syrup onto white sugar particles of a thickness of 0.1 to 1 micron.

8. Process as defined in claim 7 wherein said atomizing is carried out at a pressure of 1000–3000 p.s.i.

9. Process as defined in claim 8, wherein the temperature is maintained at 45°–85° C.

10. Process as defined in claim 9, wherein said temperature is 55°–75° C.

11. Process as defined in claim 7, wherein said syrup contains 15 percent to 25 percent water, 15 percent to 40 percent invert sugar and 6 percent to 10 percent mineral salts.

12. Process as defined in claim 11, wherein said syrup contains 18 percent to 22 percent water.

13. Process as defined in claim 12, wherein said syrup has a color measured in milliabsorbency units on a spectrophotometer at 420 millimicrons wavelength of about 11,000.